(12) United States Patent
Fiorini

(10) Patent No.: US 7,747,264 B2
(45) Date of Patent: Jun. 29, 2010

(54) METHOD AND APPARATUS FOR DELIVERING ADVERTISEMENTS TO MOBILE USERS

(75) Inventor: Nicolas Fiorini, Pelissanne (FR)

(73) Assignee: Myriad Group AG, Dubendorf (CH)

( * ) Notice: Subject to any disclaimer, the term of this patent is extended or adjusted under 35 U.S.C. 154(b) by 545 days.

(21) Appl. No.: 11/525,233

(22) Filed: Sep. 20, 2006

(65) Prior Publication Data

US 2007/0271139 A1 Nov. 22, 2007

Related U.S. Application Data

(60) Provisional application No. 60/801,648, filed on May 18, 2006.

(51) Int. Cl.
*H04M 3/42* (2006.01)
*H04W 4/00* (2009.01)
(52) U.S. Cl. .................................. 455/466; 455/414.1
(58) Field of Classification Search .............. 455/414.1, 455/403, 466
See application file for complete search history.

(56) References Cited

U.S. PATENT DOCUMENTS

| | | | | |
|---|---|---|---|---|
| 6,018,654 | A * | 1/2000 | Valentine et al. | 455/414.4 |
| 6,052,591 | A * | 4/2000 | Bhatia | 455/445 |
| 7,020,479 | B2 | 3/2006 | Martschitsch | |
| 7,353,016 | B2 * | 4/2008 | Roundtree et al. | 455/414.1 |
| 7,369,864 | B2 * | 5/2008 | Vaananen | 455/466 |
| 7,653,569 | B1 * | 1/2010 | Zbib | 455/419 |
| 2002/0026361 | A1 | 2/2002 | Blom | |
| 2002/0077130 | A1 | 6/2002 | Owensby | |
| 2002/0123359 | A1 * | 9/2002 | Wei et al. | 455/466 |
| 2003/0072425 | A1 * | 4/2003 | Hurst | 379/114.01 |
| 2004/0063445 | A1 * | 4/2004 | Vaananen | 455/466 |
| 2005/0245241 | A1 * | 11/2005 | Durand et al. | 455/414.1 |
| 2006/0079247 | A1 | 4/2006 | Ritter | |
| 2008/0139184 | A1 * | 6/2008 | Mottes | 455/414.1 |
| 2008/0139230 | A1 * | 6/2008 | Mottes | 455/466 |

FOREIGN PATENT DOCUMENTS

| | | |
|---|---|---|
| WO | WO 02/39765 | 5/2002 |
| WO | WO 03/044703 | 5/2003 |

OTHER PUBLICATIONS

Written Opinion of the International Searching Authority.PCT/EP2007/003642. Applicant: Esmertec AG (Apr. 2007).

* cited by examiner

*Primary Examiner*—Lester Kincaid
*Assistant Examiner*—Nathan Mitchell
(74) *Attorney, Agent, or Firm*—Perkins Coie LLP

(57) ABSTRACT

Techniques for delivering advertisements and similar promotional messages to mobile users using USSD technology are disclosed. USSD provides session-based communication in which transactions occur only during a session. Advertisements may be delivered through USSD in several ways: by inserting a short text into a message in a mobile-initiated USSD session, by temporarily diverting a mobile-initiated USSD session toward an advertisement sub-session, by triggering a network-initiated USSD session the main purpose of which is the delivery of an advertisement, and by causing a mobile user to initiate a USSD session the main purpose of which is the delivery of an advertisement. Also disclosed is a process for inserting advertisements into USSD messages, a process for inserting advertisement sub-sessions into USSD sessions, and a process for delivering advertisements with network-initiated USSD sessions.

30 Claims, 10 Drawing Sheets

METHOD AND APPARATUS FOR DELIVERING ADVERTISEMENTS TO MOBILE USERS

CROSS-REFERENCE TO RELATED APPLICATIONS

This application claims the benefit of U.S. Provisional Application No. 60/801,648, filed May 18, 2006, incorporated herein by reference in its entirety.

BACKGROUND OF INVENTION

1. Field of Invention

The present invention relates to the field of messaging services in mobile telecommunications networks. More specifically, the present invention discloses techniques for delivering advertisements and similar promotional messages to users of mobile devices.

2. Description of Related Art

Mobile telecommunications are now extremely popular. There are now more than one billion GSM (Global System for Mobile) subscribers worldwide. Usage has evolved from a purely voice-oriented model to data communications, messaging (Short Messaging Service (SMS)), multimedia (Multimedia Messaging Service (MMS)), and browsing (Wireless Application Protocol (WAP)).

From the point of view of advertisers, mobile devices are an attractive channel of communication. However, at the present time there are surprisingly few techniques for delivering advertisements to mobile users in a way that is cost-effective, unobtrusive, and compliant with regulations. The present invention provides such techniques.

Prior art advertising on mobile devices typically proceeds via SMS or WAP.

SMS marketing campaigns consist in sending massive amounts of short text messages to mobile users. In case a mobile user wishes to request more information or to accept a promotional offer, the short text messages typically contain instructions for calling a telephone number, replying with another SMS message, or accessing a WAP site.

Advertising on WAP services is very similar to advertising on the World Wide Web (WWW). Both textual and graphical marketing messages can be added to WAP pages. "Click-through" hyperlinks allow users to access further information.

Other methods of delivering advertisements to mobile devices include the following. U.S. patent application Ser. No. 09/907,629 by Blom discloses a method involving an advertisement broker who obtains advertisements from advertisers and provides those advertisements to mobile users. But an advertisement is only provided to mobile users whose positions lie within a location associated with that advertisement, and the advertisement is sent to mobile users via email, which may not be supported by some mobile devices. U.S. patent application Ser. No. 09/907,899 by Gledje discloses a method whereby a service provider delivers advertisements to mobile users who are located in zones associated with those advertisements, who satisfy various demographic criteria, and who have subscribed to an advertising service. But many countries have privacy regulations that forbid provision of such location and demographic information to service providers. Further, location- and subscriber-based approaches are not appropriate for some types of advertising.

Current advertising on mobile devices faces a number of problems. Among these are the following.

1. The screens of mobile devices are much smaller than those of computers. Consequently, large advertisements may appear obtrusive, and small advertisements may go unnoticed.
2. Due to the nature of wireless networks, delivering advertising content to mobile devices is costly, either to the advertiser, to the mobile operator, or to the mobile user. It is more expensive to send SMS messages than to send emails, and mobile users are typically billed for the volume of WAP data they receive, which includes advertisements.
3. Unlike television viewers and computer users, mobile device users tend to look at their mobile devices only when they need to perform a specific task, such as answering or initiating a voice call, receiving or sending a Short Message, or accessing a WAP service. Moreover, it is difficult to divert the attention of mobile device users when they are about to perform one of these tasks.
4. Advertisements are most useful if they provide a way for recipients to respond to promotional messages immediately and at no cost. In most networks, sending a SMS reply or accessing a WAP page achieves the former objective but not the latter.
5. Advertisers need statistics to measure the effectiveness of their marketing campaigns.
6. When an advertisement is inserted into an existing service, the provider of that service desires to receive compensation for providing advertising space to the advertiser.
7. Mobile device users generally consider advertising messages to be an annoyance. Consequently, mobile operators are reluctant to allow advertising on their networks, for fear of losing customers.
8. Advertising is most effective when it is carefully targeted. However, many countries have strict regulations regarding privacy. Consequently, advertisers cannot have access to all of the relevant information, such as the identities and locations of users.

Various embodiments of the present invention address several of these problems.

SUMMARY OF THE INVENTION

The present invention contemplates a variety of techniques for the delivery of advertisements and similar promotional messages to mobile device users. According to one embodiment, the advertising medium is situated in a communication network that includes mobile device users, databases, service providers, a mobile operator, and an advertising server.

One embodiment of the present invention contemplates techniques for delivering advertisements and similar promotional messages through the Unstructured Supplementary Service Data (USSD) bearer in the Global System for Mobile (GSM) or $3^{rd}$ Generation (3G) networks. Those skilled in the art will know that USSD is a communication technology that is used to send text between a mobile device and an application in one of these networks. USSD provides session-based communication in which transactions occur only during a session.

Advertisements can be delivered through USSD in several ways.

First, a short text may be inserted into a message of a mobile-initiated USSD session. This text may contain instructions, such as keywords or alphanumeric labels, so that the mobile device user can request additional advertising material. Message traffic between a mobile device user and a service provider must be monitored, that mobile device user and that service provider must be identified, a message from that service provider to that mobile user must be selected, and it must be decided whether it is appropriate to insert an advertisement into that message. If it is decided to insert an advertisement into that message, an advertiser and an advertising message must be selected. The selected advertisement must be transcoded so that it uses the same character set as that of the message.

The original message is then modified to include the advertisement, and the modified message is forwarded to the mobile user. It should be ensured that insertion of the advertisement does not cause the message to exceed the maximum length allowed by the USSD standard; a long message can be split and displayed as two successive USSD messages.

Information regarding the modification must be stored so that it can later be determined whether the response of the mobile user to the modified message responds to the original USSD message or to the advertisement. Depending on the mobile user's response, the original USSD session is either continued or diverted into an advertising sub-session.

Second, a mobile-initiated USSD session may be temporarily diverted toward an advertisement sub-session. In this scenario, the mobile device user is forced to read the advertisement and then to send a USSD reply message indicating whether the user would prefer to read more advertising material or to return to the original USSD session. The mobile operator may allow the mobile device user to manage her marketing preferences from within the USSD session, by offering such commands as "Disable ads" or "Don't tell me about this product anymore". Again, message traffic between the mobile device user and the service provider must be monitored, the mobile device user and the service provider must be identified, and it must be decided whether it is appropriate to display advertisements in the USSD session.

If it is decided to display an advertisement, an advertiser and an advertisement must be selected, and times during the USSD session when it is appropriate to insert an advertisement must be identified. The USSD session can then be diverted into an advertising sub-session. Selection of appropriate times for the delivery of advertisements typically involves detection of markers inserted in messages by service providers that indicate suitable times for advertisements, detection of messages that indicate the end of a USSD session, and detection of transitions within a USSD session from one service provider to another service provider.

The selection of an advertiser and an advertisement in the above methods typically involves identification of keywords that the service provider has inserted into its messages, the automatic detection of words in a USSD message, detection of the brand and model of the mobile device that is being used, looking up marketing preferences previously supplied by the mobile device user in a database, looking up a list of advertisers that a service provider has blacklisted in a database, and looking up a list of service providers that an advertiser has blacklisted in a database.

One or more steps in the above methods may be performed off-line, and the results may be stored in a database until such time as a mobile user accesses her USSD service.

Third, a network-initiated USSD session may be triggered the main purpose of which is the delivery of an advertisement. Again, an appropriate time for the delivery of an advertisement must be selected, an advertiser and an advertisement must be selected, and a network-initiated USSD session must be triggered. An appropriate time may be selected by determining a session when the mobile user has just completed a voice call, has just sent a short message, or has just completed a WAP session. Such a session may be determined by, for example, monitoring calling records generated by Mobile Switching Centers (MSCs) associated with the service provider or by monitoring CAMEL transactions between MSCs and SCPs, or by monitoring messages between MSCs and Short Message Service Centers.

For this method to be effective and unobtrusive, the USSD session should be initiated at a time when the user is interacting with her mobile device but is not involved in an urgent task that requires her full attention. For example, the session can be triggered when the user has just ended a mobile-initiated USSD session, has completed a voice call, has sent a SMS, or has completed a WAP session. Such conditions can be detected by monitoring the appropriate signaling interfaces of the mobile network.

The decision to send an advertisement in one of these ways to a mobile user may involve the steps of looking up in a database whether the mobile user has requested that her USSD service not be interrupted by advertisements or the relevant service provider has requested that its service not be interrupted by advertisements.

Fourth, a mobile user may be caused to initiate a USSD session the main purpose of which is the delivery of an advertisement. For example, an advertiser can publish a message in a printed newspaper that urges readers to dial a specific USSD code on their mobile telephones.

One embodiment of the present invention is typically implemented in the form of a GSM Service Control Point (SCP), a GSM Service Control Function (SCF), a USSD gateway, a USSD Center, a USSD service portal, or a similar server, in compliance with the requirements of GSM Technical Specifications. Servers are typically connected to the core GSM network and are operated by mobile operators. Alternatively, a single USSD server can be connected to several mobile operators and operated by an independent third party.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention contemplates a variety of techniques for the delivery of advertisements and similar promotional messages to mobile device users. One embodiment of the present invention contemplates techniques for delivering such advertisements and promotional messages through the Unstructured Supplementary Service Data (USSD) bearer in the Global System for Mobile (GSM) or $3^{rd}$ Generation (3G) networks.

USSD is a standard feature of the GSM and 3G networks and is originally described in GSM Technical Specifications 02.90, 03.90, and 04.90. USSD provides a text-only, bidirectional, interactive, and session-oriented channel of communication between mobile devices and servers in the Home Public Land Mobile Network (HPLMN) and the Visited Public Land Mobile Network (VPLMN) of mobile subscribers.

There are two major versions of the USSD protocol; version 2 is the most popular. A version 2 USSD session can be initiated either by a mobile user or by a network, and permits messages containing up to 182 characters from one of several character sets. Version 1 supports mobile-initiated sessions only, and permits messages up to 200 characters in length.

USSD is used routinely by millions of mobile device users to check their balances and to refill their prepaid accounts. This practice offers an attractive opportunity for the delivery of advertisements.

Unlike SMS traffic, USSD traffic is entirely under the control of mobile operators. Therefore, mobile operators can ensure that their customers are not inconvenienced by unsolicited advertising. For example, mobile operators can implement a permission-based marketing policy and can allow their customers to disable or filter advertisements.

Although mobile operators generally are not allowed to reveal the identities, locations, or other attributes of mobile device users to advertisers, these operators may be allowed to use such information to implement targeted advertising; that is, to select advertisements that are most likely to be of interest to a particular mobile user. Increasing the relevance of advertisements in this manner benefits both mobile users and advertisers. Since the process of targeting advertisements can be computationally intensive, it can be performed off-line, in order to reduce response times.

Many mobile networks do not bill mobile device users for their USSD traffic. Therefore, mobile users may be more inclined to respond to advertisements delivered through USSD than to reply to SMS marketing messages or to click through WAP advertisement banners.

Figure 1:
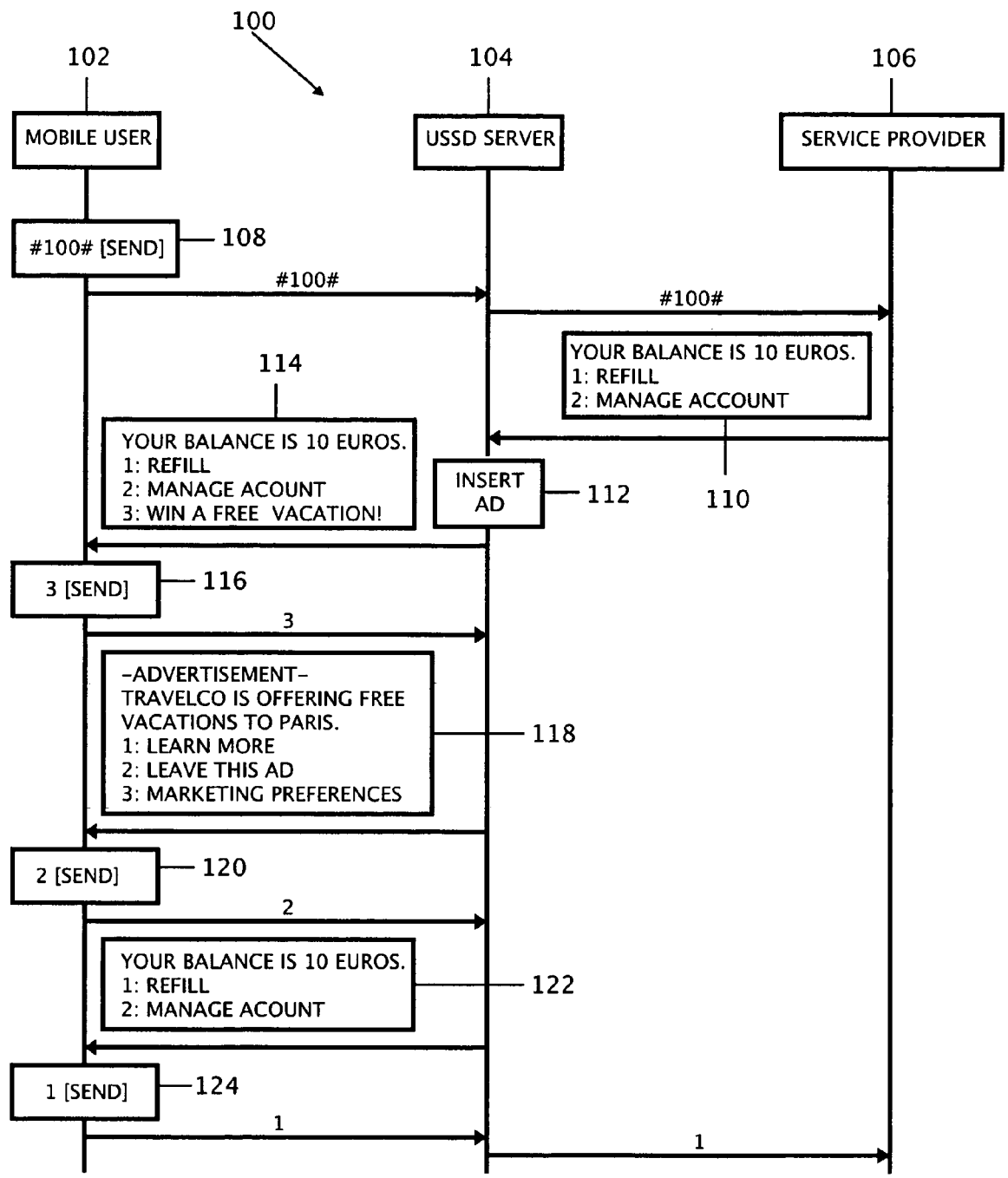
FIG. 1 is a diagram illustrating a method for inserting a short text into a message of a mobile-initiated USSD session.

FIG. 1 illustrates a method 100 for inserting a short text into a message of a mobile-initiated USSD session. A mobile user 102 sends a message 108 to a USSD server 104 requesting the balance of her account. For example, the mobile user may be operating a cell phone and using that cell phone to send a USSD message. The USSD server 104 forwards the message 108 to the appropriate service provider 106. The service provider 106 returns a message 110 to the USSD server 104 that reports the balance of the user's account and presents the user with the options of refilling (1) and managing account (2). The USSD server then inserts the advertising message "3: Win a free vacation!" into the reply message and sends the modified message 114 to the mobile user 102.

Continuing the USSD session, the mobile user 102 next sends a message 116 to the USSD server 104 requesting option 3; that is, requesting that the full advertisement be displayed on the mobile device. The USSD server 104 then sends the full advertisement 118 to the mobile user 102. At this point the mobile user 102 selects option 2 ("Leave this ad") from the full advertisement 118 and sends the appropriate message 120 to the USSD server. The USSD server 104 then sends the original reply message 122 to the mobile user 102. The mobile user selects option 1 ("Refill") from the reply message 122 and sends the appropriate message 124 to the USSD server 104, which then forwards that message to the service provider 106.

Figure 2:
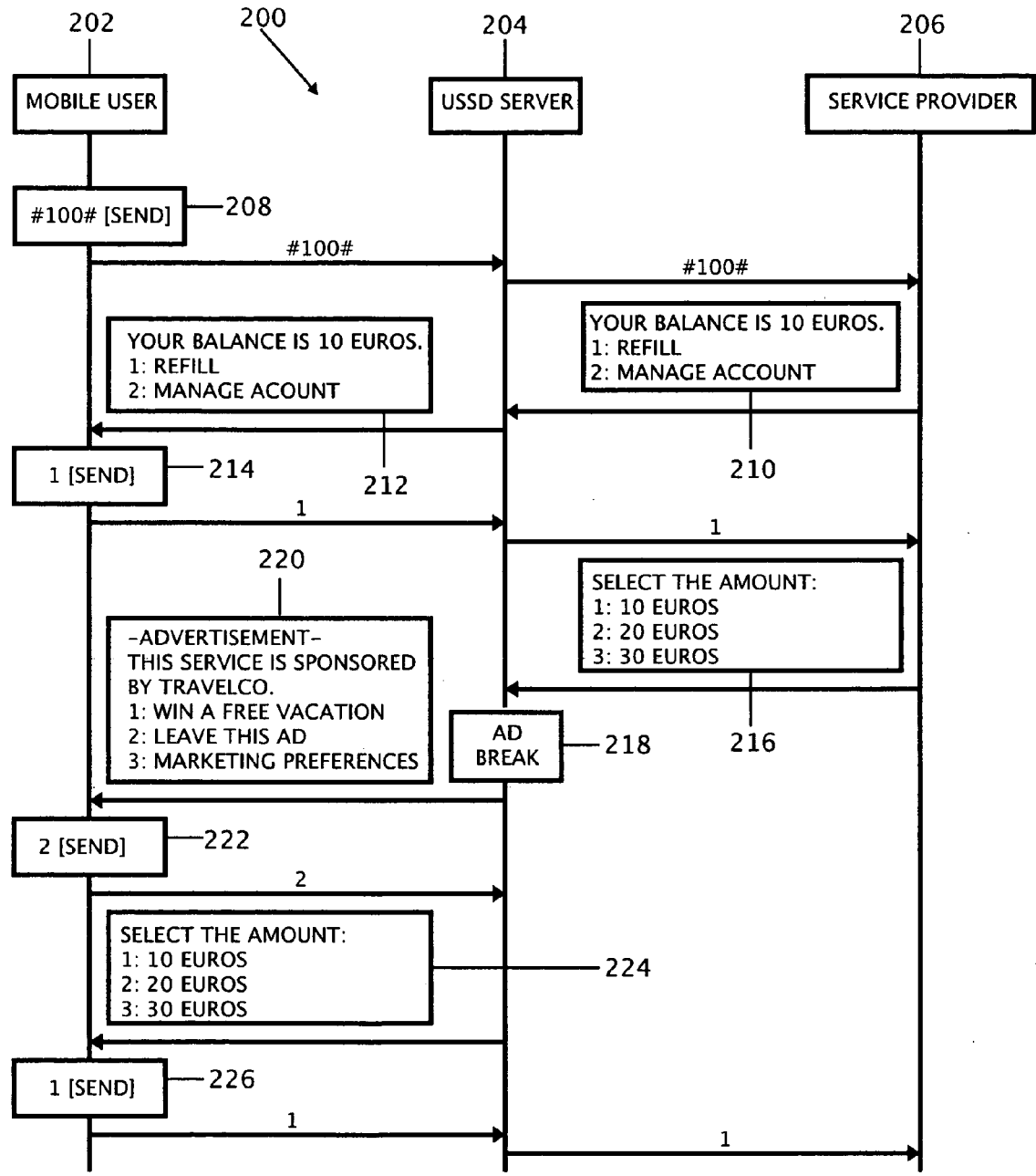
FIG. 2 is a diagram illustrating a method for temporarily diverting a mobile-initiated USSD session toward an advertisement sub-session.

FIG. 2 illustrates a method 200 for temporarily diverting a mobile-initiated USD session toward an advertising sub-session. A mobile user 202 sends a message 208 to a USSD server 204 requesting the balance of her account. For example, the mobile user may be operating a cell phone and using that cell phone to send a USSD message. The USSD server 204 forwards the message 208 to the appropriate service provider 206. The service provider 206 returns a message 210 to the USSD server 204 that reports the balance of the user's account and presents the user with the options of refilling (1) and managing account (2). The USSD server 204 forwards the reply message 212 to the mobile user.

Continuing the USSD session, the mobile user 202 selects option 1 ("Refill") and sends the appropriate message 214 to the USSD server 204. The USSD server 204 forwards the mobile user's message 214 to the service provider 206, and the service provider returns a message 216 to the USSD server that requests that the mobile user 202 select the amount by which her account is to be refilled: 1: 10 euros, 2: 20 euros, or 3: 30 euros. At this point the USSD server 204 inserts an advertising break 218 into the USSD session, thereby diverting that session toward an advertising sub-session. In the sub-session, the USSD server 204 sends an advertisement 220 to the mobile user 202.

Continuing the USSD session, the mobile user selects option 2 ("Leave this ad") from the advertisement 220 and sends the appropriate message 222 to the USSD server 204. The USSD server 204 then forwards the reply message 224 to the mobile user 202. The mobile user selects option 1 ("10 euros") from the reply message 224, and sends the appropriate message 226 to the USSD server 204. The USSD server 204 then forwards the mobile user's message 226 to the service provider 206.

Figure 3:
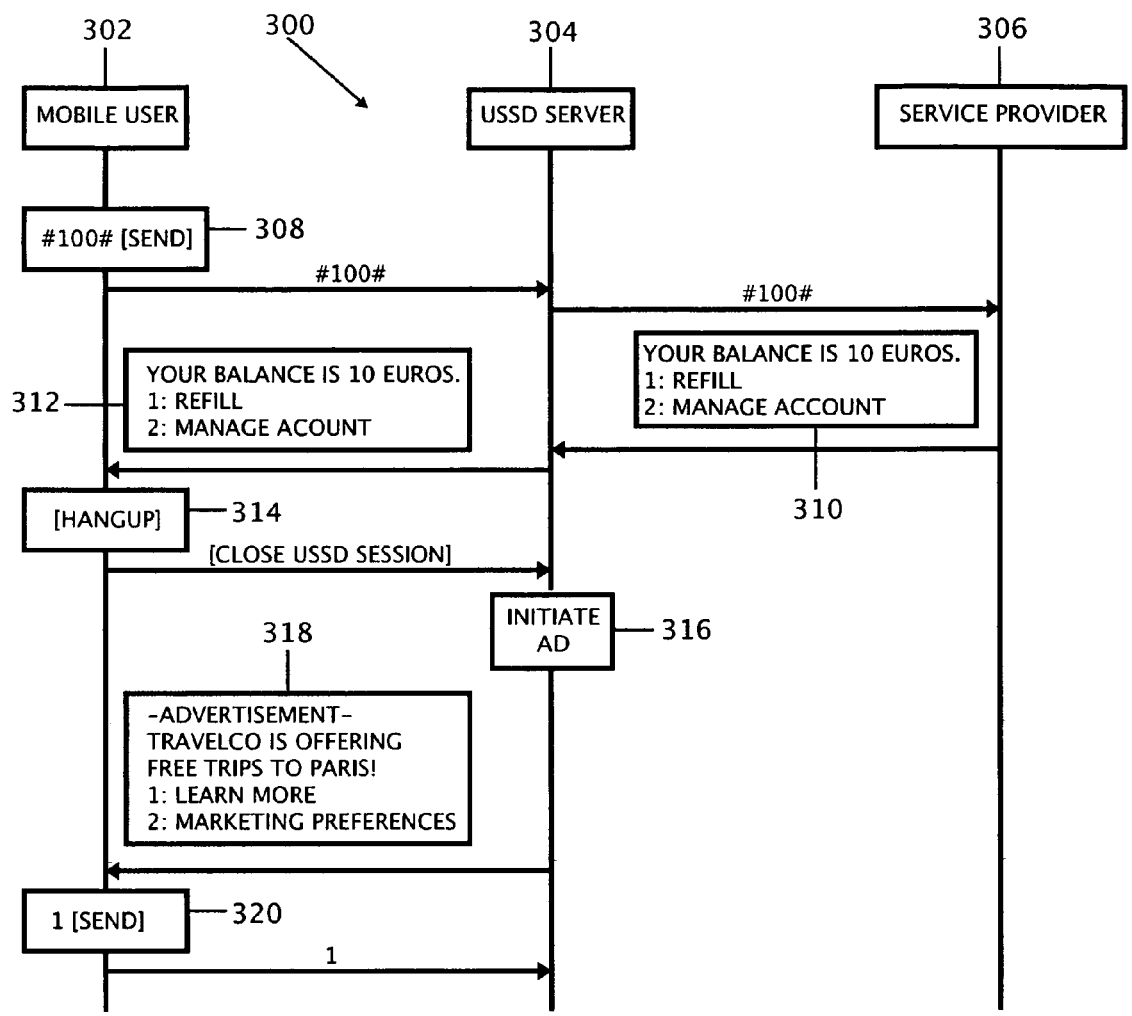
FIG. 3 is a diagram illustrating a method for triggering a network-initiated USSD session the main purpose of which is the delivery of an advertisement.

FIG. 3 illustrates a method 300 for triggering a network-initiated USSD session the main purpose of which is the delivery of an advertisement. A mobile user 302 sends a message 308 to a USSD server 304 requesting the balance of her account. For example, the mobile user may be operating a cell phone and using that cell phone to send a USSD message. The USSD server 304 forwards the user's message 308 to the appropriate service provider 306. The service provider 306 sends a reply message 310 to the USSD server 304 that reports the balance of the user's account and presents the user with two options: (1) Refill, and (2) Manage account. The USSD server forwards the reply message 312 to the mobile user, who then hangs up 314, thereby terminating the USSD session.

At this point, the USSD server initiates an advertisement 316 and sends that advertisement 318 to the mobile user 302. The mobile user 302 selects option 1 ("Learn more") from the advertisement 318 and sends the appropriate message 320 to the USSD server.

Finally, an advertisement can be delivered through USSD by causing a mobile user to initiate a USSD session the main purpose of which is the delivery of an advertisement. For example, an advertiser can publish a message in a printed newspaper that urges readers to dial a specific USSD code on their mobile telephones.

In practice, the process of delivering advertisements through USSD may involve additional steps not shown in the figures described previously. These additional steps are well known to those skilled in the art, and are omitted from the figures in the interest of clarity. For example, in one embodiment the USSD server consults a database (not shown) to determine whether the mobile user has requested that she not receive advertisements or the service provider has requested that its service not be interrupted by advertisements; the USSD server also logs the responses of the mobile user to advertisements for billing purposes. The USSD server also transcodes advertising messages to ensure that they use the same character set as the messages into which they are inserted.

Figure 4:
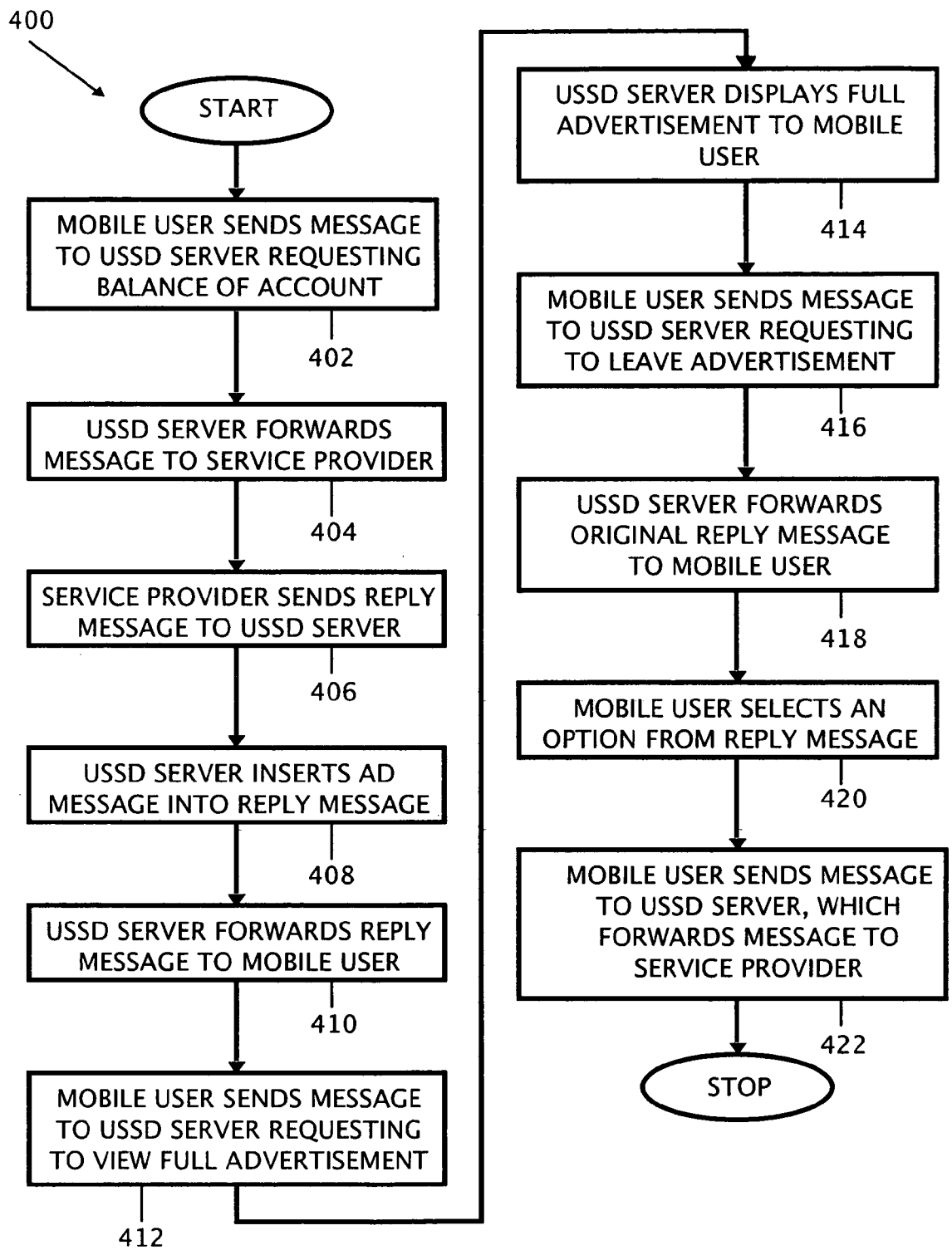
FIG. 4 is a flow chart showing another method for providing advertising content in a mobile-initiated USSD session by inserting a short text into a USSD message.

FIG. 4 is a flow chart 400 showing another method for providing advertising content in a mobile-initiated USSD session by inserting a short text into a USSD message. In a first step 402, a mobile user sends a message to a USSD server requesting the balance of her account. For example, the mobile user may be operating a cell phone and using that cell phone to send a USSD message. In a next step 404, the USSD server forwards that message to the appropriate service provider. In a next step 406, the service provider sends a reply message to the USSD server. The reply message might state the balance of her account and present her with the options of 1: Refill and 2: Manage account. In a next step 408, the USSD server inserts an advertising message into the reply message. That advertising message might comprise a third option such as 3: Win a free vacation.

Continuing in a next step 410, the USSD server forwards the (modified) reply message to the mobile user. In a next step 412, the mobile user sends a message to the USSD server requesting to view the full text of the advertisement. In a next step 414, the USSD server displays the full text of the advertisement to the mobile user. In a next step 416, the mobile user sends a message to the USSD server requesting to leave the advertisement.

Continuing in a next step 418, the USSD server forwards the original reply message to the mobile user. In a next step 420, the mobile user selects an option from the reply message. For example, the mobile user might select option 1: Refill. In a next and final step 422, the mobile user sends the appropriate message to the USSD server, which then forwards that message to the service provider.

Figure 5:
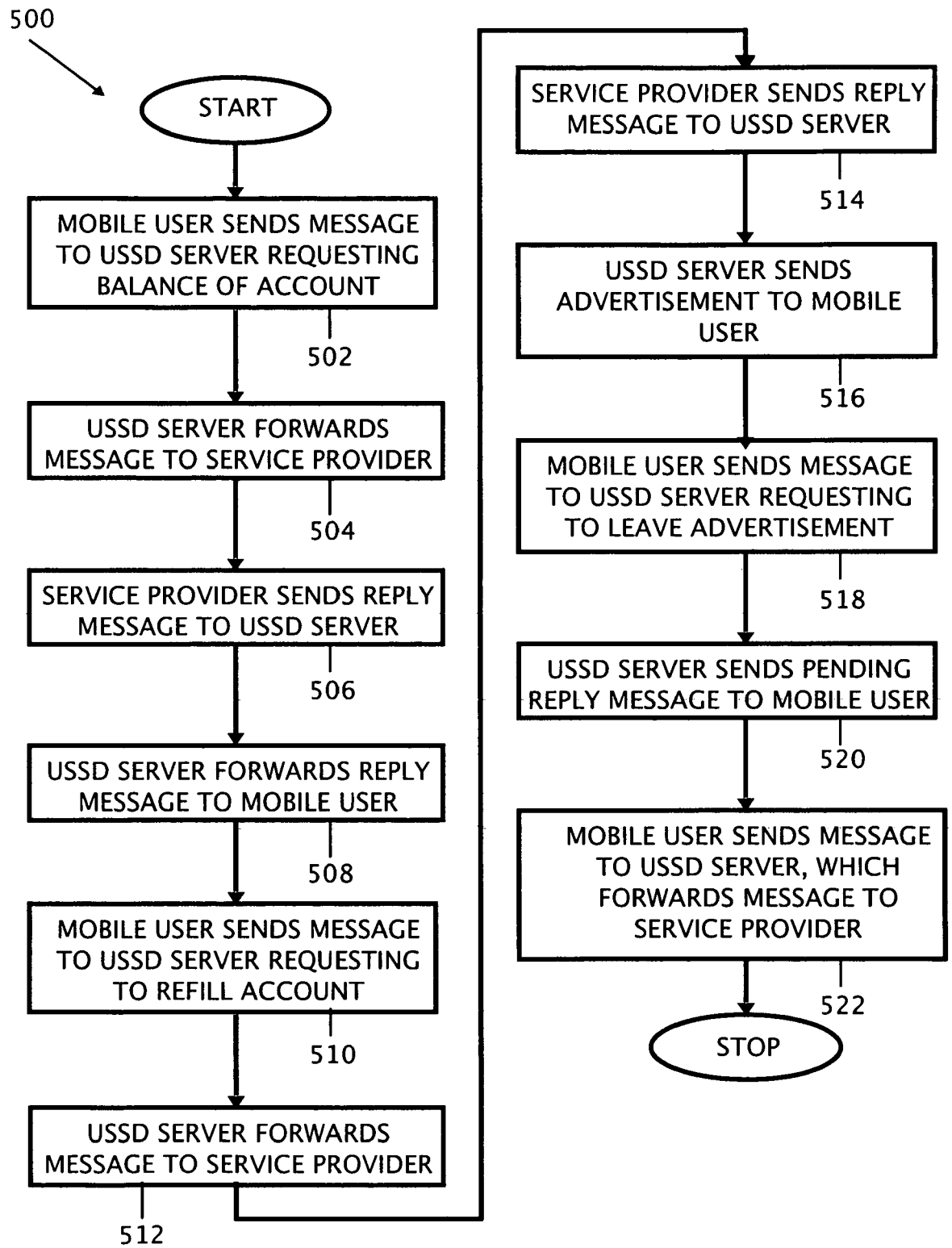
FIG. 5 is a flow chart showing another method for providing advertising content in a mobile-initiated USSD session by temporarily diverting that session toward an advertisement sub-session.

FIG. 5 is a flow chart 500 showing another method for providing advertising content in a mobile-initiated USSD session by temporarily diverting that session toward an advertisement sub-session. In a first step 502, a mobile user sends a message to a USSD server requesting the balance of her account. For example, the mobile user may be operating a cell phone and using that cell phone to send a USSD message. In a next step 504, the USSD server forwards that message to the appropriate service provider. In a next step 506, the service provider sends a reply message to the USSD server. The reply message might state the balance of the mobile user's account and present the mobile user with the options 1: Refill and 2: manage account. In a next step 508, the USSD server forwards that reply message to the mobile user.

Continuing in a next step 510, the mobile user sends a message to the USSD server requesting to refill her account. In a next step 512, the USSD server forwards that message to the service provider. In a next step 514, the service provider sends a reply message to the USSD server. The reply message might prompt the mobile user to select the amount by which her account is to be refilled, and might present the mobile user with several options from which to select. In a next step 516, the USSD server sends an advertisement to the mobile user, thereby diverting the USSD session to an advertising sub-session. In a next step 518, the mobile user sends a message to the USSD server requesting to leave the advertisement.

Continuing in a next step 520, the USSD server sends the pending reply message to the mobile user. In a next and final step 522, the mobile user sends a message to the USSD server, which then forwards that message to the service provider. That message might select the option of refilling the user's account in the amount 10 euros.

Figure 6:
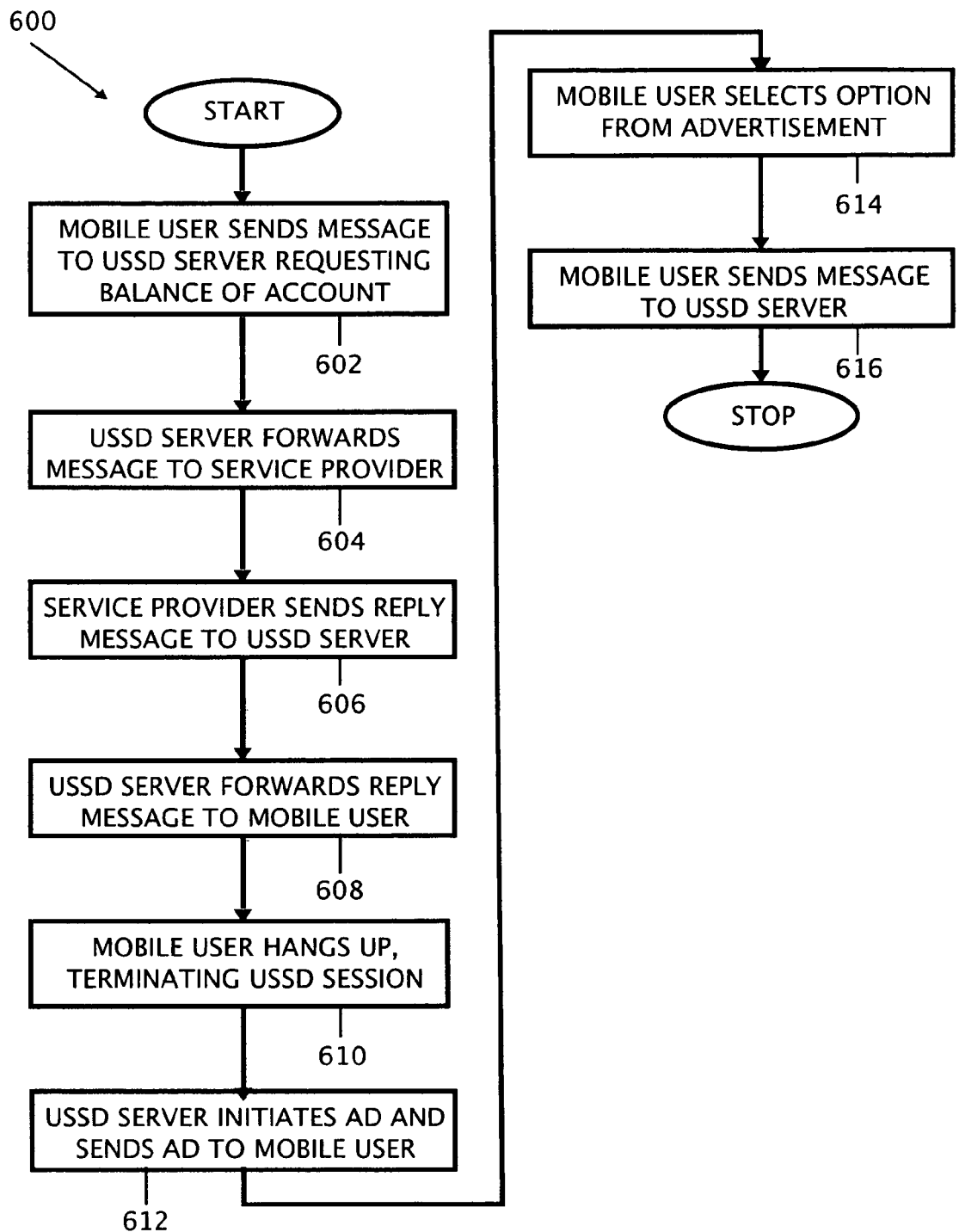
FIG. 6 is a flow chart showing a method for providing advertising content in a network-initiated USSD session the main purpose of which is the delivery of an advertisement.

FIG. 6 is a flow chart 600 showing a method for providing advertising content in a network-initiated USSD session the main purpose of which is the delivery of an advertisement. In a first step 602, a mobile user sends a message to a USSD server requesting the balance of her account. For example, the mobile user may be operating a cell phone and using that cell phone to send a USSD message. In a next step 604, the USSD server forwards that message to the appropriate service provider. In a next step 606, the service provider sends a reply message to the USSD server. The reply message might state the balance of her account and present her with the options of 1: Refill and 2: Manage account. In a next step 608, the USSD server forwards that reply message to the mobile user.

Continuing in a next step 610, the mobile user hangs up, thereby terminating the USSD session. In a next step 612, the USSD server initiates an advertisement and sends that advertisement to the mobile user. That advertisement may present the mobile user with such options as 1: Learn more and 2: Marketing preferences. In a next step 614, the mobile user selects an option such as option 1 from that advertisement. In a next and final step, the mobile user sends a message such as option 1 to the USSD server.

Figure 7:
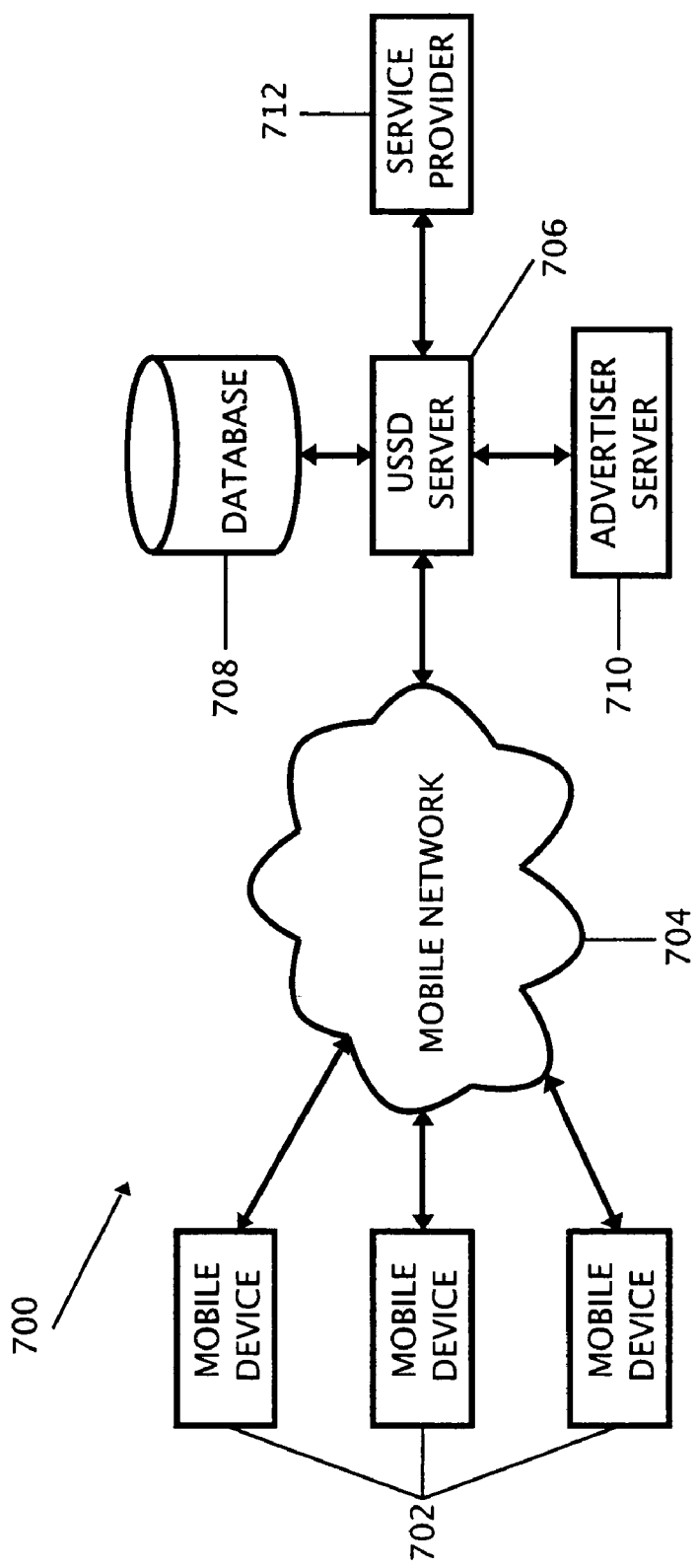
FIG. 7 is a diagram illustrating a communication network for providing advertisements to mobile device users in accordance with the present invention.

FIG. 7 is a diagram 700 illustrating a communication network for providing advertisements to mobile device users in accordance with the present invention. Mobile devices 702 are connected to a mobile network 704, which in turn is connected to a USSD server 706. The USSD server 706 is also connected to various service providers such as 712.

The USSD server is also connected to a database 708 that contains several types of information pertaining to advertising through USSD. The USSD server is also connected to an advertiser server 710, which permits advertisers to place advertisements with the mobile operator for inclusion on the USSD server and subsequent delivery to mobile users.

The interaction between the mobile devices, the USSD server, and the service providers are detailed above in the descriptions of FIGS. 1 through 6.

Figure 8:
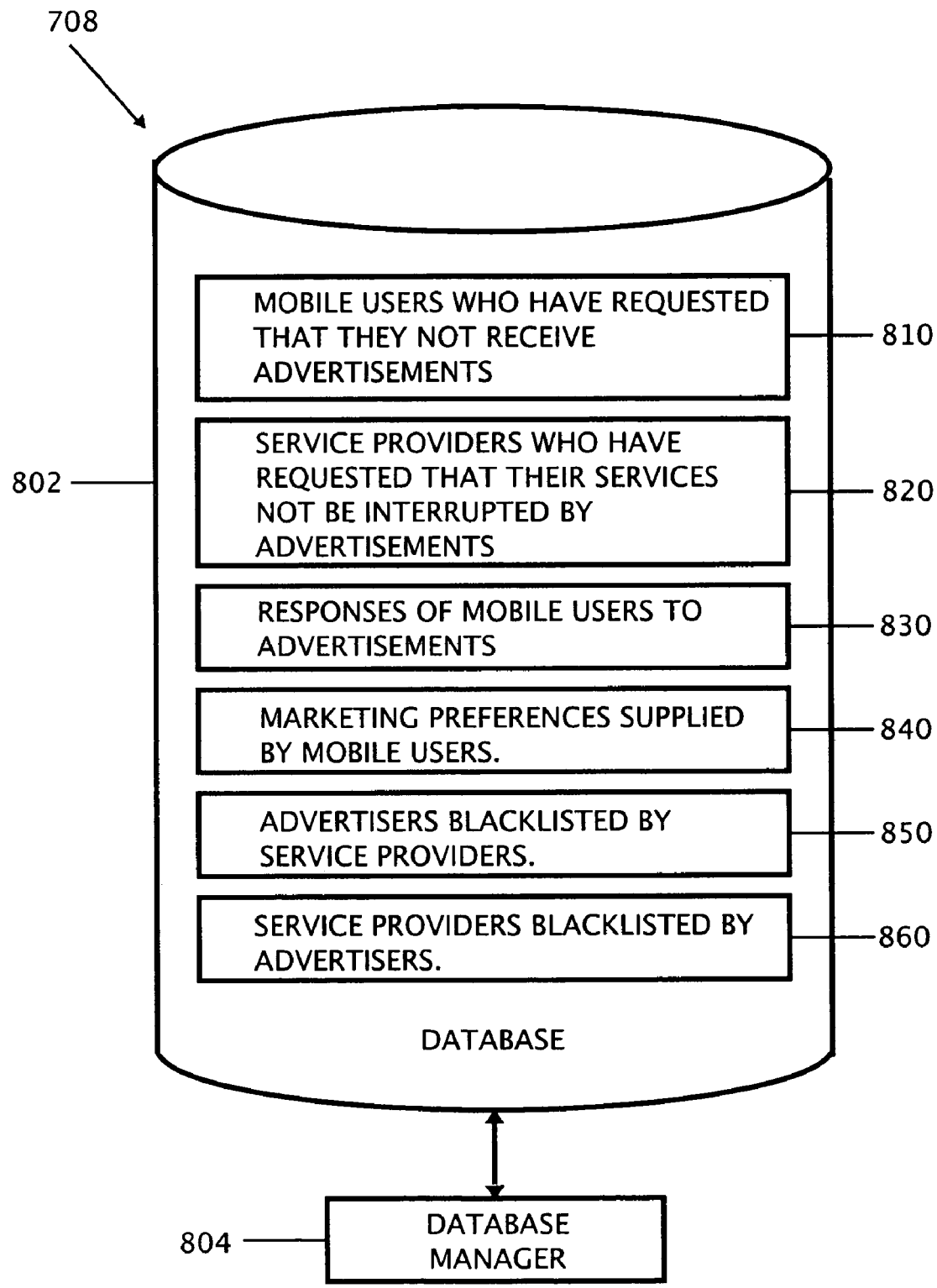
FIG. 8 is a pictorial image of the database referenced in FIG. 7, together with a database manager.

FIG. 8 is a pictorial image of the database 708 referenced in FIG. 7. The database 802 contains several types of information, including 810 mobile users who have requested that their service not be interrupted by advertisements; 820 service providers who have requested that their services not be interrupted by advertisements; and 830 responses of mobile users to previous advertisements, which are used for billing purposes. In one previously mentioned embodiment of the present invention, the USSD server logs the responses of type 830 to the database and checks the database for requests of types 810 and 820 before deciding whether to send advertisements to mobile users. The database 802 may also contain 840 marketing preferences supplied by mobile users, 850 lists of advertisers that have been blacklisted by service providers, and 860 lists of service providers that have been blacklisted by advertisers. The database 802 is connected to a database manager 804 and to the USSD server 706 (not shown). The database manager 804 writes information to the database 802 and reads information from that database 802.

Figure 9:
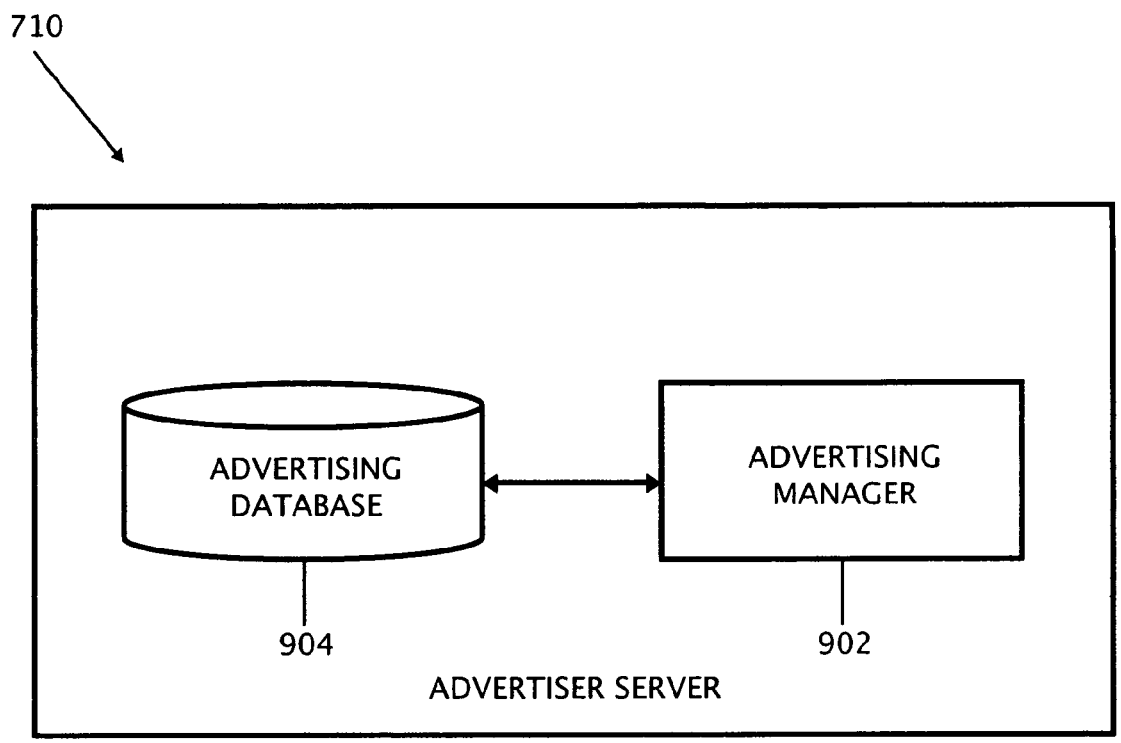
FIG. 9 is a pictorial image of the advertiser server referenced in FIG. 7.

FIG. 9 is a pictorial image of the advertiser server 710 referenced in FIG. 7. The advertiser server 710 includes an advertising database 904 that is connected to an advertising manager 902. The advertising database 904 contains such information as the text of advertising messages to be provided to mobile device users, criteria to be used in the selection of USSD messages into which advertising content is to be inserted, and criteria to be used in the selection of advertising content to be inserted into selected USSD messages. The advertising database 904 may also contain some of the information contained in database 802. The advertising manager 902 writes data into the advertising database 904 and reads data from that database 904.

Figure 10:
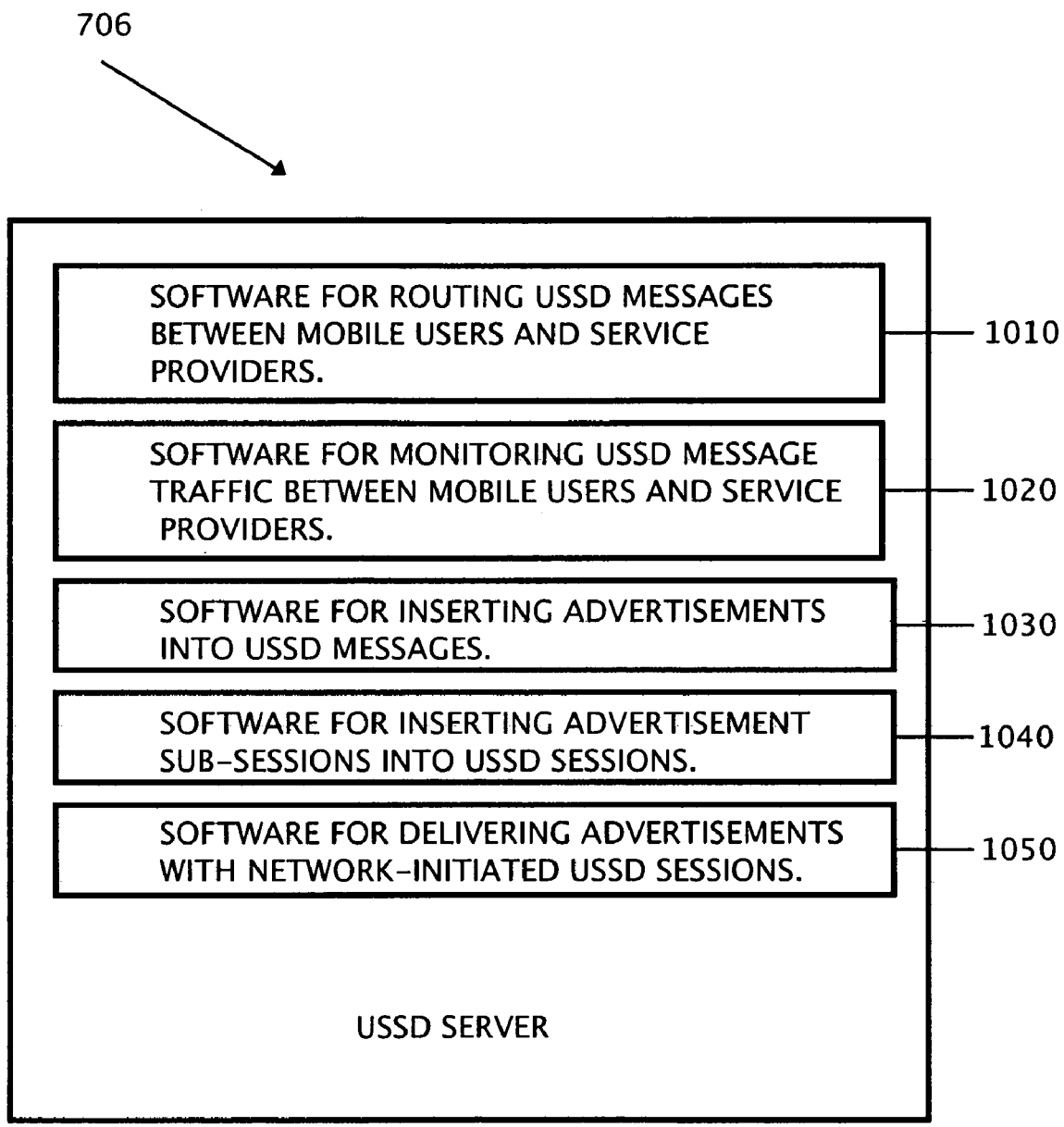
FIG. 10 is a pictorial image of the USSD server referenced in FIG. 7.

FIG. 10 is a pictorial image of the USSD server 706 referenced in FIG. 7. The USSD server 706 contains several types of software, including 1010 software for routing USSD messages between mobile users and service providers, 1020 software for monitoring USSD message traffic between mobile users and service providers, 1030 software for inserting advertisements into USSD messages, 1040 software for inserting advertisement sub-sessions into USSD sessions, and 1050 software for delivering advertisements with network-initiated USSD sessions.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A process for inserting an advertisement into a USSD message, the process comprising:
    identifying a USSD message to be sent by a service provider to a mobile user of a mobile device in response to a request initiated by the mobile user;
    selecting a specific advertisement to be inserted in the USSD message, wherein the mobile user is a target and intended recipient of the specific advertisement;
    generating a transcoded advertisement by transcoding the specific advertisement to adapt to a character set of the USSD message;
    modifying the USSD message by inserting the transcoded advertisement into the USSD message;
    forwarding the modified USSD message to the mobile user;
    monitoring the mobile user's response to the modified USSD message, wherein the mobile user's response is sent through the mobile device; and
    displaying to the mobile user an advertising sub-session when the mobile user elects to view the advertising sub-session in response to the modified USSD message, wherein the advertising sub-session includes at least one of:
        one or more USSD messages related to the specific advertisement; or
        one or more USSD responses from the mobile user.

2. The process of claim 1, further comprising:
    causing the mobile device to alert the mobile user prior to triggering the USSD session by performing at least one of:
        initiating a voice call to the mobile user; or
        sending a text message to the mobile user,
    wherein the mobile device is used by the mobile user to receive the USSD message.

3. The process of claim 1, wherein the specific advertisement is based on the specific WAP service that the mobile user accesses.

4. The process of claim 1, further comprising:
    logging to a database to examine how the mobile user responded to the specific advertisement to enable a mobile operator to bill an advertiser and/or compensate the service provider.

5. The process of claim 1, wherein a decision by the USSD server to insert a particular advertisement into the USSD message is based on at least one of:
    a first length of the USSD message;
    a second length of the particular advertisement; or
    a maximum allowable length of the USSD message.

6. The process of claim 1, wherein a decision to display advertisements to the mobile user is based on at least one of:
    looking-up in a database to determine whether the mobile user has requested not to receive advertisements; or
    looking-up in a database to determine whether the service provider has requested not to receive advertisements.

7. The process of claim 1, wherein the specific advertisement is selected by using at least one of:
    information that the service provider explicitly attaches to its messages;
    detecting words in the USSD message;
    detecting the brand and/or model of the mobile device used by the mobile user;
    marketing preferences supplied by the mobile user;
    a database including a list of advertisers or categories of advertisers that the mobile user has blacklisted; or
    a database including a list of advertisers or categories of advertisers that the service provider has blacklisted.

8. The process of claim 1, wherein one or more steps of the process are performed off-line and a corresponding set of results are stored in a database until the mobile user accesses the USSD service.

9. A process for inserting an advertisement sub-session into a USSD session, the process comprising:
    monitoring message traffic between a service provider and a mobile user of a mobile device;
    identifying the service provider and the mobile user;
    identifying an appropriate time to display advertisements in a particular USSD session between the service provider and the mobile user;
    selecting a specific advertisement for delivery to the mobile user to be inserted into the particular USSD session, wherein the mobile user is a target and intended recipient of the specific advertisement; and
    diverting the particular USSD session to an advertisement sub-session, the advertising sub-session including one or more USSD messages related to the specific advertisement and one or more USSD responses from the mobile user.

10. The process of claim 9, wherein the appropriate time includes a session time when the mobile user utilizes or completes at least one of:
    a mobile-initiated USSD session;
    a voice call;
    a text message; or
    a WAP session.

11. The process of claim 10, wherein the session time for the voice call or the text message is determined by at least one of:
    monitoring calling records generated by Mobile Switching Centers (MSCs) associated with the service provider;
    monitoring CAMEL transactions between MSCs and SCPs; or
    monitoring messages between MSCs and Short Message Service Centers.

12. The process of claim 10, wherein the session time for the WAP session is determined by at least one of:
    monitoring WAP traffic between the mobile user and a WAP gateway;

monitoring WAP traffic between the WAP gateway and a WAP service provider;
requiring WAP service providers to generate a notification event when a user accesses a WAP service.

13. The process of claim 9, further comprising:
causing the mobile device to alert the mobile user prior to triggering the USSD session by performing at least one of:
  initiating a voice call to the mobile user; or
  sending a text message to the mobile user,
wherein the mobile device is used by the mobile user to receive during the USSD session.

14. The process of claim 9, wherein the specific advertisement is based on the specific WAP service that the mobile user accesses.

15. The process of claim 9, further comprising:
logging to a database to examine how the mobile user responded to the specific advertisement to enable a mobile operator to bill an advertiser and/or compensate the service provider.

16. The process of claim 9, wherein a decision by the USSD server to display advertisements to the mobile user is based on at least one of:
  looking-up in a database to determine whether the mobile user has requested not to receive advertisements; or
  looking-up in a database to determine whether the service provider has requested not to receive advertisements.

17. The process of claim 9, wherein the specific advertisement is selected by using at least one of:
  information that the service provider explicitly attaches to its messages;
  detecting words in the USSD message;
  detecting the brand and/or model of a mobile device used by the mobile user;
  marketing preferences supplied by the mobile user;
  a database including a list of advertisers or categories of advertisers that the mobile user has blacklisted; or
  a database including a list of advertisers or categories of advertisers that the service provider has blacklisted.

18. The process of claim 9, wherein one or more steps of the process are performed off-line and a corresponding set of results are stored in a database until the mobile user accesses the USSD service.

19. The process of claim 9, wherein the appropriate time to display advertisements is determined based on at least one of:
  detecting a specific marker that the service provider inserts to indicate a suitable time for displaying advertisements;
  detecting a marker that indicates an end of a particular USSD session; or
  detecting transitions within a given USSD session.

20. A process for delivering an advertisement using a network-initiated USSD session, the process comprising:
  monitoring message traffic between a service provider and a mobile user;
  selecting an appropriate time for delivering advertisements to the mobile user;
  selecting an advertiser and a specific advertisement to be delivered to the mobile user, wherein the mobile user is the target and intended recipient of the specific advertisement;
  triggering a network-initiated USSD session; and
  delivering the advertisement to the mobile user.

21. The process of claim 20, wherein the appropriate time includes a session time when the mobile user utilizes or completes at least one of:
  a mobile-initiated USSD session;
  a voice call;
  a text message; or
  a WAP session.

22. The process of claim 21, wherein the session time for the voice call or the text message is determined by at least one of:
  monitoring calling records generated by Mobile Switching Centers (MSCs) associated with the service provider;
  monitoring CAMEL transactions between MSCs and SCPs; or
  monitoring messages between MSCs and Short Message Service Centers.

23. The process of claim 21, wherein the session time for the WAP session is determined by at least one of:
  monitoring WAP traffic between the mobile user and a WAP gateway;
  monitoring WAP traffic between the WAP gateway and a WAP service provider;
  requiring WAP service providers to generate a notification event when a user accesses a WAP service.

24. The process of claim 20, further comprising:
causing a mobile device to alert the mobile user prior to triggering the USSD session by performing at least one of:
  initiating a voice call to the mobile user; or
  sending a text message to the mobile user, wherein the mobile device is used by the mobile user to receive during the USSD session.

25. The process of claim 20, wherein the specific advertisement is based on the specific WAP service that the mobile user accesses.

26. The process of claim 20, further comprising:
logging to a database to examine how the mobile user responded to the specific advertisement to enable a mobile operator to bill an advertiser and/or compensate the service provider.

27. The process of claim 20, wherein a decision by the USSD server to display advertisements to the mobile user is based on at least one of:
  looking-up in a database to determine whether the mobile user has requested not to receive advertisements; or
  looking-up in a database to determine whether the service provider has requested not to receive advertisements.

28. The process of claim 20, wherein the specific advertisement is selected by using at least one of:
  information that the service provider explicitly attaches to its messages;
  detecting words in the USSD message;
  detecting the brand and/or model of a mobile device used by the mobile user;
  marketing preferences supplied by the mobile user;
  a database including a list of advertisers or categories of advertisers that the mobile user has blacklisted; or
  a database including a list of advertisers or categories of advertisers that the service provider has blacklisted.

29. The process of claim 20, wherein one or more steps of the process are performed off-line and a corresponding set of results are stored in a database until the mobile user accesses the USSD service.

30. The process of claim 20, wherein the appropriate time to display advertisements is determined based on at least one of:
  detecting a specific marker that the service provider inserts to indicate a suitable time for displaying advertisements;
  detecting a marker that indicates an end of a particular USSD session; or
  detecting transitions within a given USSD session.

* * * * *